US011535355B2

(12) United States Patent
Lakebrink et al.

(10) Patent No.: US 11,535,355 B2
(45) Date of Patent: Dec. 27, 2022

(54) AERODYNAMIC BODY FOR SUPERSONIC SPEED

(71) Applicant: The Boeing Company, Chicago, IL (US)

(72) Inventors: Matthew T. Lakebrink, O'Fallon, MO (US); Kevin G. Bowcutt, Aliso Viejo, CA (US)

(73) Assignee: The Boeing Company, Chicago, IL (US)

( * ) Notice: Subject to any disclaimer, the term of this patent is extended or adjusted under 35 U.S.C. 154(b) by 418 days.

(21) Appl. No.: 16/804,304

(22) Filed: Feb. 28, 2020

(65) Prior Publication Data

US 2021/0269137 A1    Sep. 2, 2021

(51) Int. Cl.
*B64C 1/00* (2006.01)
*B64C 30/00* (2006.01)
*B64C 1/38* (2006.01)

(52) U.S. Cl.
CPC ............ *B64C 1/0009* (2013.01); *B64C 30/00* (2013.01); *B64C 1/38* (2013.01)

(58) Field of Classification Search
CPC ......... B64C 1/0009; B64C 30/00; B64C 1/38; B64C 2001/0045
See application file for complete search history.

(56) References Cited

U.S. PATENT DOCUMENTS

| 3,724,386 A | 4/1973 | Schmidt |
| 4,014,485 A | 3/1977 | Kinnaird et al. |
| 6,398,158 B1 * | 6/2002 | Reeves ............... B64C 30/00 244/105 |
| 2006/0228474 A1 | 10/2006 | Foss et al. |
| 2007/0170309 A1 * | 7/2007 | Schafroth ............. B64C 1/0009 244/36 |
| 2011/0017864 A1 * | 1/2011 | Roemerman ........... F42C 15/20 244/3.16 |
| 2011/0133021 A1 | 6/2011 | Lugg |
| 2016/0252334 A1 * | 9/2016 | Cary ..................... B64C 1/0009 244/130 |
| 2021/0070475 A1 * | 3/2021 | Sharma ................... B64G 1/14 |

FOREIGN PATENT DOCUMENTS

EP    2 851 257    3/2015

OTHER PUBLICATIONS

Global Security, WaveRider, 2006, GlobalSecurity.org, https://web.archive.org/web/20060419061945/https://www.globalsecurity.org/military/systems/aircraft/waverider.htm (Year: 2006).*

* cited by examiner

*Primary Examiner* — Tien Q Dinh
*Assistant Examiner* — William L Gmoser
(74) *Attorney, Agent, or Firm* — Walters & Wasylyna LLC

(57) ABSTRACT

An aerodynamic body includes an upper surface and a lower surface. The upper surface includes a first portion of a first axisymmetric body. The lower surface is mated with the upper surface. The lower surface includes a waverider shape. The waverider shape is derived from the shockwave generated by a second axisymmetric body.

20 Claims, 10 Drawing Sheets

AERODYNAMIC BODY FOR SUPERSONIC SPEED

FIELD

The present disclosure relates generally to aerodynamic bodies and, more particularly, to an aerodynamic body, such as at least a portion of an aerospace vehicle, having a shape operable to increase the maximum lift-to-drag ratio of the aerodynamic body at greater than supersonic speeds with concurrent high volumetric efficiency.

BACKGROUND

In aerodynamics, the lift-to-drag ratio is the amount of lift generated by an aerospace vehicle, divided by the aerodynamic drag it creates by moving through the air. A higher or more favorable lift-to-drag ratio is typically one of the major goals in aerospace design. Since an aerospace vehicle's required lift is set by its weight, delivering that lift with lower drag leads directly to better fuel economy, climb performance, and glide ratio. Additionally, at very high speeds, lift-to-drag ratios tend to be lower.

Volumetric efficiency is the amount of volume a body contains, divided by the surface area of the body. A higher volumetric efficiency requires less structure and, thus, less structural weight to encompass the volume that is used to carry payload, fuel and systems. Therefore, higher volumetric efficiency results in a lighter aerospace vehicle. Achieving high aerodynamic efficiency (e.g., lift-to-drag ratio) is typically diametrically opposed to achieving high volumetric efficiency.

Existing designs tend to reach performance barriers that limit the maximum lift-to-drag ratio and, thus, limit the aerodynamic efficiency and/or the volumetric efficiency of the aerospace vehicle. Accordingly, those skilled in the art continue with research and development efforts to improve the aerodynamic efficiency of aerospace vehicles, and, as such, aerodynamic bodies and methods intended to address the above-identified concerns would find utility.

SUMMARY

The following is a non-exhaustive list of examples, which may or may not be claimed, of the subject matter according to the present disclosure.

In an example, a disclosed aerodynamic body includes an upper surface and a lower surface. The upper surface includes a portion of a first axisymmetric body. The lower surface is mated with the upper surface. The lower surface includes a waverider shape. The waverider shape is derived from a shockwave generated by a second axisymmetric body.

In an example, a disclosed aerospace vehicle includes an upper surface and a lower surface. The upper surface includes a portion of a first axisymmetric body. The lower surface is mated with the upper surface. The lower surface includes a waverider shape. The waverider shape is derived from a shockwave generated by a second axisymmetric body.

In an example, a disclosed method of making an aerodynamic body includes steps of: (1) forming an upper surface of the aerodynamic body, the upper surface including a portion of a first axisymmetric body; (2) forming a lower surface of the aerodynamic body, the lower surface including a waverider shape derived from a shockwave generated by a second axisymmetric body; and (3) mating the upper surface and the lower surface.

Other examples of the disclosed system, apparatus, and method will become apparent from the following detailed description, the accompanying drawings, and the appended claims.

DETAILED DESCRIPTION

Figure 1:
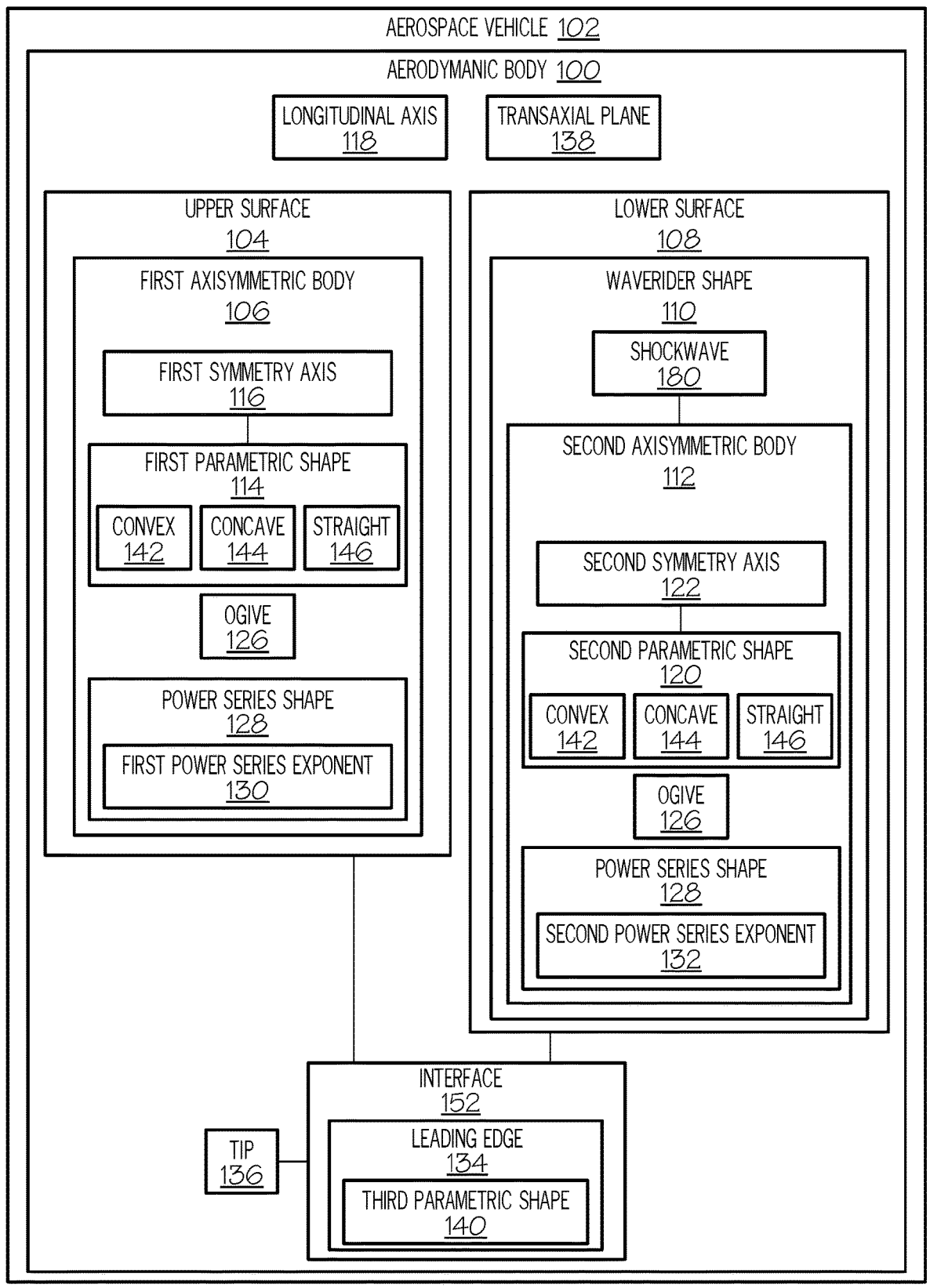
FIG. 1 is a schematic block diagram of an example of an aerodynamic body.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Referring generally to FIGS. 1-15, by way of examples, the present disclosure is directed to an aerodynamic body 100. In one or more examples, the aerodynamic body 100 is, or takes the form of, an aerospace vehicle 102 (FIG. 1). In one or more examples, the aerodynamic body 100 is, or takes the form of, at least a portion of the aerospace vehicle 102, such as a portion of a fuselage or a nose of the aerospace vehicle 102. For example, the aerodynamic body 100 may be applied to, or form, a tip, a leading edge, and/or fore-body of the aerospace vehicle 102. The disclosed aerodynamic body 100 provides aerodynamic shapes for aerospace vehicles 102 that concurrently achieve high aerodynamic efficiency and high volumetric efficiency.

Design of the aerodynamic body 100, such as design of the aerospace vehicle 102, is optimized to maximize the aerodynamic efficiency of the aerodynamic body 100, such as by maximizing the lift-to-drag ratio ("L/D") at very high speeds, such as speeds greater than supersonic speed. Design of the aerodynamic body 100, such as design of the aerospace vehicle 102, is also optimized to maximize the volumetric efficiency of the aerodynamic body 100, such as by maximizing an overall volume of the aerodynamic body 100 and minimizing a surface area of the aerodynamic body 100.

For the purpose of the present disclosure, speeds greater than supersonic speed generally refer to speeds greater than Mach 1, such as speeds greater than Mach 2. In some examples, speeds greater than supersonic speed refer to speeds greater than Mach 5, generally referred to as hypersonic speed. Generally, hypersonic speeds are the point at which the molecules of air that surround an aerodynamic body, such as an aerospace vehicle, start to change thermodynamically by exciting rotational and vibrational modes, breaking apart (e.g., dissociation) and/or becoming electrically charged (e.g., ionization) and start to meaningfully affect the aerodynamics and aerothermodynamics of flight.

Referring to FIG. 1, in one or more examples, the aerodynamic body 100 includes an upper surface 104 and a lower surface 108. The upper surface 104 includes, or is formed by a first axisymmetric body 106. For example, the upper surface 104 includes, or is formed by a portion of the first axisymmetric body 106. The lower surface 108 is mated with the upper surface 104. The lower surface 108 includes, or is formed by, a waverider shape 110. The waverider shape 110 is derived from a shockwave 180 generated by a second axisymmetric body 112.

Thus, the aerodynamic body 100, such as the aerospace vehicle 102, has a hybrid three-dimensional shape that includes elements of the first axisymmetric body 106, forming the upper surface 104, and the waverider shape 110 derived from the shockwave 180 generated by the second axisymmetric body 112, forming the lower surface 108. The hybrid shape of the aerodynamic body 100 advantageously overcomes performance barriers that have traditionally limited maximum lift-to-drag ratios for bodies with high volumetric efficiency. For example, the hybrid-shape design of the aerodynamic body 100 enables an increase in the maximum lift-to-drag ratio and, thus, the aerodynamic efficiency, of the aerodynamic body 100 at speeds greater than supersonic speed, such as at speeds greater than hypersonic speed, and enables in increase in the volumetric efficiency compared to traditional aircraft design.

An axisymmetric body refers to a two-dimensional shape that resides in three-dimensional space and that is symmetric about one symmetry axis and that has rotational symmetry about the symmetry axis with respect to any angle. Generally, an axisymmetric body is formed by a two-dimensional ("2D") shape (e.g., a linear or curved line segment) that is rotated about the symmetry axis.

In various examples, each one of the first axisymmetric body 106 and the second axisymmetric body 112 is one of a variety of different axisymmetric bodies. In one or more examples, the first axisymmetric body 106 and the second axisymmetric body 112 are the same. In one or more examples, the first axisymmetric body 106 and the second axisymmetric body 112 are different.

In one or more examples, the first axisymmetric body 106 includes, or is formed by, a first parametric shape 114 that is rotated about a first symmetry axis 116. In one or more examples, the first parametric shape 114 is a two-dimensional parametric shape (e.g., a line) that is rotated about the first symmetry axis 116 to form the first axisymmetric body 106.

In one or more examples, at least a portion of the first parametric shape 114 is convex 142 along the first symmetry axis 116. In one or more examples, at least a portion of the first parametric shape 114 is concave 144 along the first symmetry axis 116. In one or more examples, at least a portion of the first parametric shape 114 is straight 146 along the first symmetry axis 116. In one or more examples, the first parametric shape 114 is a complex shape that includes at least a first portion that is convex 142, concave 144, or straight 146 and a second portion that is convex 142, concave 144, or straight 146.

In one or more examples, the second axisymmetric body 112 includes, or is formed by, a second parametric shape 120 that is rotated about a second symmetry axis 122. In one or more examples, the second parametric shape 120 is a two-dimensional parametric shape (e.g., a line) that is rotated about the second symmetry axis 122 to form the second axisymmetric body 112.

In one or more examples, at least a portion of the second parametric shape 120 is convex 142. In one or more examples, at least a portion of the second parametric shape 120 is concave 144. In one or more examples, at least a portion of the second parametric shape 120 is straight 146. In one or more examples, the second parametric shape 120 is a complex shape that includes at least a first portion that is convex 142, concave 144, or straight 146 and a second portion that is convex 142, concave 144, or straight 146.

In one or more examples, the first parametric shape 114 and the second parametric shape 120 are the same. In one or more examples, the first parametric shape 114 and the second parametric shape 120 are different.

Figure 2:
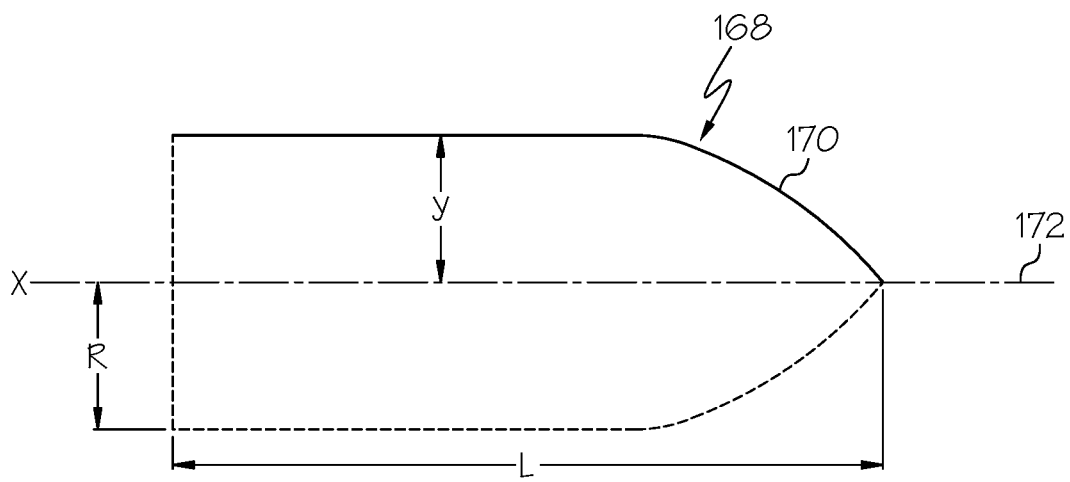
FIG. 2 is a schematic, elevation view of an example of an axisymmetric body used to form at least one of an upper surface of the aerodynamic body and a waverider shape of a lower surface of the aerodynamic body.
Figure 3:
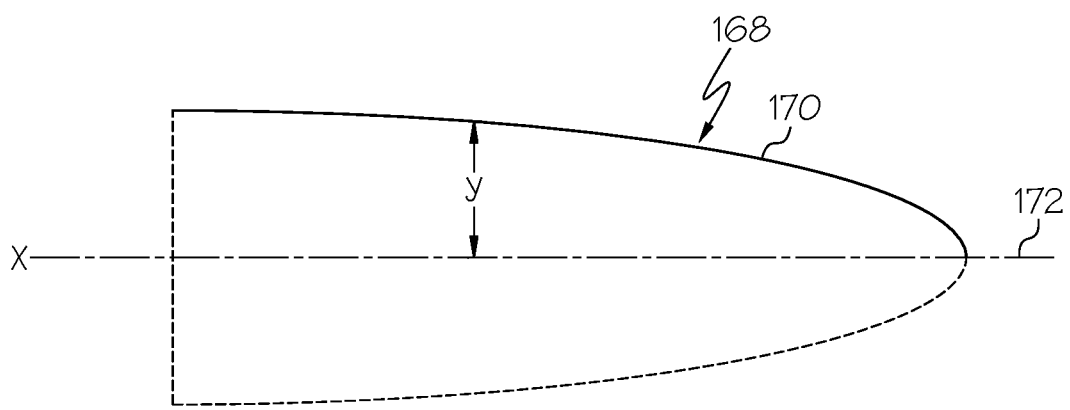
FIG. 3 is a schematic, elevation view of another example of the axisymmetric body.
Figure 4:
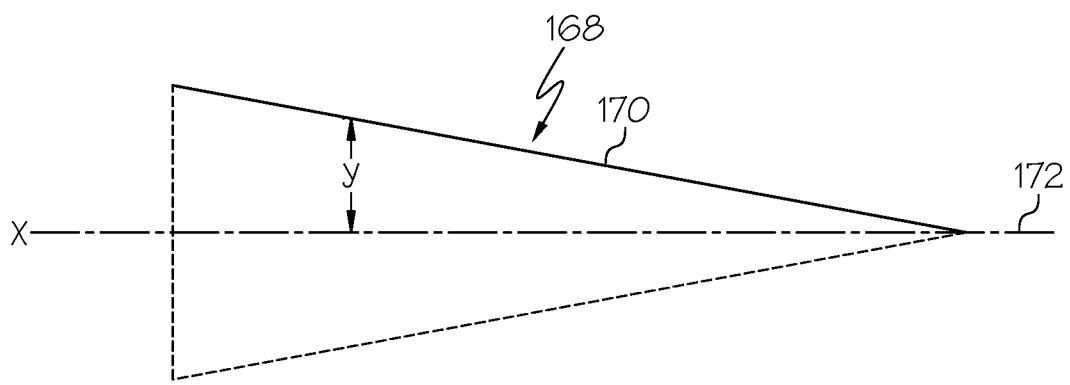
FIG. 4 is a schematic, elevation view of yet another example of the axisymmetric body.

FIGS. 2-4 schematically illustrate examples of an axisymmetric body 168. The axisymmetric body 168 (depicted by broken line) is formed by a parametric shape 170 (depicted by solid line) that is rotated about a symmetry axis 172 of the axisymmetric body 168. In the illustrative examples, the axisymmetric body 168 is an example of the first axisymmetric body 106 (FIG. 1) and/or the second axisymmetric body 112 (FIG. 1), the parametric shape 170 is an example of the first parametric shape 114 (FIG. 1) and/or the second parametric shape 120 (FIG. 1), and the symmetry axis 172 is an example of the first symmetry axis 116 (FIG. 1) and/or the second symmetry axis 122 (FIG. 1).

In the illustrative examples, the axisymmetric body 168 has an overall length L and a base-radius R at a base of the axisymmetric body 168. The axisymmetric body 168 also has a radius y at any point x, in which x varies along the symmetry axis 172 from zero at the tip of the axisymmetric body 168 to length L at the base of the axisymmetric body 168. In one or more examples, radius y varies as x varies along the symmetry axis 172. In one or more examples, radius y varies as x varies along a portion of the symmetry axis 172 and radius y is constant as x varies along another portion of the symmetry axis 172.

In one or more examples, as illustrated in FIG. 2, the axisymmetric body 168 is ogival. In these examples, the parametric shape 170 includes a linear segment and a circular arc that extends from the linear segment and that intersects the symmetry axis 172. In one or more examples, the circular arc has a radius greater than a diameter of a cylindrical section formed by the linear segment of the parametric shape 170 rotated about the symmetry axis 172.

Accordingly, in one or more examples, at least one of the first axisymmetric body 106 and the second axisymmetric body 112 is an ogive 126 (FIG. 1). In one or more examples, each of the first axisymmetric body 106 and the second axisymmetric body 112 is an ogive 126. In various examples, the ogive 126 is one of a tangent ogive, a spherically blunted tangent ogive, a secant ogive, an elliptical ogive, or a complex ogive.

In one or more examples, as illustrated in FIG. 3, the axisymmetric body 168 is parabolic. In these examples, the parametric shape 170 is a segment of a parabola that intersects the symmetry axis 172.

In one or more examples, as illustrated in FIG. 4, the axisymmetric body 168 is conical. In this example, the parametric shape 170 is a segment of a linear line that intersects the symmetry axis 172.

In one or more examples (not illustrated), the axisymmetric body 168 is elliptical. In these examples, the parametric shape 170 is a segment of an ellipse that intersects the symmetry axis 172.

In one or more examples, the axisymmetric body 168 is a power series shape. Generally, the power series shape is characterized by a tip that ranges in shape from more sharp to more blunt. The power series shape is generated by a $y=R(x/L)^n$ curve with values of n that are less than 1, where n is the power-series exponent. The factor n controls the bluntness of the tip of the power series shape. For example, the tip of the power series shape is fairly sharp for values of n above about 0.7. As n decreases towards zero, the power series shape becomes increasingly blunt.

Accordingly, in one or more examples, at least one of the first axisymmetric body 106 and the second axisymmetric body 112 is a power series shape 128 (FIG. 1). Accordingly, in one or more examples, each one of the first axisymmetric body 106 and the second axisymmetric body 112 is a power series shape 128. In various examples, the power series shape 128 is one of ogival, parabolic, conical, or elliptical.

Referring to FIG. 1, in one or more examples, the first axisymmetric body 106 includes a first power-series exponent 130. For example, the power series shape 128 forming the first axisymmetric body 106 is generated by the $y=R(x/L)^{n1}$ curve (e.g., the first parametric shape 114), where n1 is the first power-series exponent 130. The second axisymmetric body 112 includes a second power-series exponent 132. For example, the power series shape 128 forming the second axisymmetric body 112 is generated by the $y=R(x/L)^{n2}$ curve (e.g., the second parametric shape 120), where n2 is the second power-series exponent 132.

In one or more examples, the first power-series exponent 130 of the first axisymmetric body 106 and the second power-series exponent 132 of the second axisymmetric body 112 are the same. In one or more examples, the first power-series exponent 130 of the first axisymmetric body 106 and the second power-series exponent 132 of the second axisymmetric body 112 are different. In one or more examples, the first power-series exponent 130 of the first axisymmetric body 106 is greater than the second power-series exponent 132 of the second axisymmetric body 112. In one or more examples, the second power-series exponent 132 of the second axisymmetric body 112 is greater than the first power-series exponent 130 of the first axisymmetric body 106.

Generally, the geometry of the aerodynamic body 100, formed by the upper surface 104 and the lower surface 108, may be generated via an optimization operation based on a variety of operational parameters and desired design constraints. The optimization operation may be implemented using an optimization program stored on memory and executed by a processor of a computing device. As such, the first axisymmetric body 106 and the second axisymmetric body 112 may be selected via the optimization operation.

In one or more examples of the optimization operation, the first axisymmetric body 106 and the second axisymmetric body 112 are selected to optimize the lift-to-drag ratio of the aerodynamic body 100, such as by increasing (e.g., maximizing) the lift-to-drag ratio ("L/D") of the aerodynamic body 100 at greater than supersonic speed. In other words, optimization is adapted to increase the maximum lift-to-drag ratio ("$L/D_{MAX}$") of the aerodynamic body 100 at greater than supersonic speed. Optimization of the lift-to-drag ratio of the aerodynamic body 100 increases the aerodynamic efficiency of the aerodynamic body 100. The first axisymmetric body 106 and the second axisymmetric body 112 are selected to optimize the volumetric efficiency of the aerodynamic body 100, such as by increasing (e.g., maximizing) the internal volume of the aerodynamic body 100 while decreasing (e.g., minimizing) the surface area of the aerodynamic body 100. During the optimization operation, optimization of (e.g., maximizing) the lift-to-drag ratio of the aerodynamic body 100 and optimization of (e.g., maximizing) the volumetric efficiency of the aerodynamic body 100 are performed concurrently.

Optimization of (e.g., maximizing) the lift-to-drag ratio of the aerodynamic body 100 and optimization of (e.g., maximizing) the volumetric efficiency of the aerodynamic body 100, such as by execution of the optimization operation, is adapted to satisfy the constraints for a specific design and/or specific operational criteria of the aerodynamic body 100. As an example, optimization of (e.g., maximizing) the lift-to-drag ratio of the aerodynamic body 100 is achieved by selection of the first axisymmetric body 106 such that drag induced by the upper surface 104 is reduced or minimized as much as possible within specified design constraints and operational specifications of the aerodynamic body 100 and selection of the second axisymmetric body 112 such that lift generated by the lower surface 108 is increased or maximized and drag induced by the lower surface 108 is reduced or minimized as much as possible within specified design constraints and operational specifications of the aerodynamic body 100. As an example, optimization of (e.g., maximizing) the volumetric efficiency of the aerodynamic body 100 is achieved by selection of the first axisymmetric body 106 and the second axisymmetric body 112 such that an overall volume of the aerodynamic body 100 is increased or maximized and the surface area of the upper surface 104 and the lower surface 108 is decreased or minimized as much as possible within specified design constraints and operational specifications of the aerodynamic body 100.

As such, the geometries of the first axisymmetric body 106 and the second axisymmetric body 112 may vary depending upon the constraints applied to the optimization operation in order to optimize or balance various design parameters, such as internal volume, lift, drag, wingspan, flight conditions, and the like. As an example, values that define the first parametric shape 114 and/or the second parametric shape 120 may be selected based on the constraints applied to the optimization operation to balance the various design parameters. An another example, the values of and/or ratio between the first power-series exponent 130 and the second power-series exponent 132 may vary depending upon and may be selected based on the constraints applied to the optimization operation to balance the various design parameters. Accordingly, geometries of the first axisymmetric body 106 and the second axisymmetric body 112, such as the values and/or ratios between the first power-series exponent 130 and the second power-series exponent 132, other than those explicitly provided by example herein are also contemplated.

In one or more examples in which the first axisymmetric body 106 is the power series shape 128, the optimization operation may drive the first power-series exponent 130 to be a lesser relative value as a result of a constraint on minimum internal volume (e.g., in order to satisfy a minimum internal volume constraint). Generally, lesser values of the power-series exponent result in more internal volume, but also in more drag. In one or more examples in which the second axisymmetric body 112 is the power series shape 128, the optimization operation may drive the second power-series exponent 132 to be a greater relative value as a result of a constraint on maximum wingspan of the aerodynamic body 100 (e.g., to maintain a maximum radius of the aerodynamic body 100 below a desired value to reduce the maximum wingspan of the aerodynamic body 100). Generally, greater values of the power-series exponent result in smaller wingspans.

In one or more examples, the second power-series exponent 132 is at least twenty-five percent (25%) greater than the first power-series exponent 130. In one or more examples, the second power-series exponent 132 is at least fifty percent (50%) greater than the first power-series exponent 130. In one or more examples, the first power-series exponent 130 is between approximately 0.3 and 0.4 and the second power-series exponent 132 is approximately 0.8.

Figure 5:
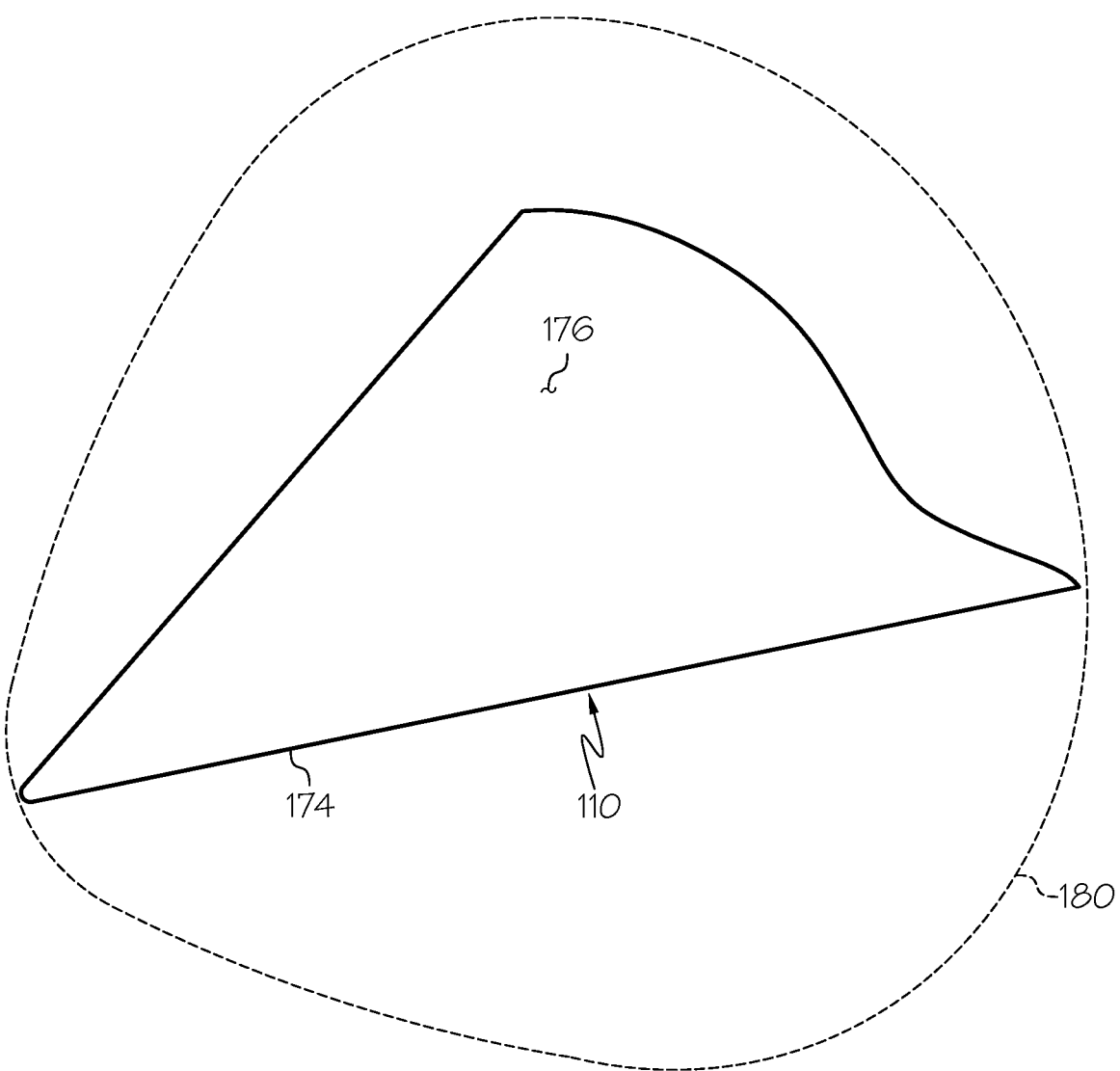
FIG. 5 is a schematic illustration of an example of a portion of a waverider shape derived from a shockwave generated by an axisymmetric body and used to form the lower surface of the aerodynamic body.

Referring to FIGS. 1 and 5, the waverider shape 110, or simply waverider, is any three-dimensional shape designed such that a shockwave generated by a body is attached along an outer leading edge of the waverider shape at design flight conditions, such as at speeds greater than supersonic speed. Generally, the lower surface 108 of the aerodynamic body 100, having the waverider shape 110, provides an aerodynamic performance advantage in terms of higher lift-to-drag ratios, compared to lower surfaces of aerodynamic bodies having non-waverider shapes.

The specific three-dimensional shape of the waverider shape 110 is uniquely defined by various parameters, such as, but not limited to, free-stream conditions, the type of generating flow-field body (i.e., the second axisymmetric body 112), and a leading-edge definition. Thus, the profile shape of the lower surface 108 of the aerodynamic body 100 flows from at least these parameters.

FIG. 5 schematically illustrates an example of a portion of the waverider shape 110 that is derived from an axisymmetric shockwave 180 generated by the second axisymmetric body 112 (not shown in FIG. 5). A surface of the second axisymmetric body 112 is the generating body for the shockwave 180 at design flight conditions. A waverider-leading edge 174 of the waverider shape 110 is formed by generating (e.g., drawing) a leading-edge curve on the shockwave 180, generated by the second axisymmetric body 112. The waverider-leading edge 174 of the waverider shape 110 is attached to the shockwave 180 along the specified (e.g., drawn) leading-edge curve. In other words, the waverider-leading edge 174 lies on the shockwave 180. A waverider-surface 176 (e.g., a stream surface) is formed by generating (e.g., tracing) streamlines from the leading-edge curve on the shockwave 180 (e.g., the waverider-leading edge 174) through a flowfield that exists downstream of the leading-edge curve between the shockwave 180 and the second axisymmetric body 112.

For clarity of illustration, FIG. 5 depicts a portion of the waverider shape 110, including a portion of the waverider-leading edge 174 and a portion of the waverider-surface 176. For example, FIG. 5, depicts a first half (e.g., a first side) of the waverider shape 110. An entirety of the waverider shape 110 includes a second half (e.g., a second side) of the waverider shape 110, which includes another portion that is a mirror image of the portion of the waverider shape 110 depicted in FIG. 5.

FIGS. 6-15 schematically illustrate an example of the aerodynamic body 100. In the illustrative example, the first axisymmetric body 106 (FIG. 1), forming the upper surface 104 of the aerodynamic body 100, is a first power-series ogive having the first power-series exponent 130 (FIG. 1). In the illustrative example, the waverider shape 110 (FIG. 1), forming the lower surface 108 of the aerodynamic body 100, is derived from the shockwave 180 (FIG. 1) generated by the second axisymmetric body 112 (FIG. 1), which is a second power-series ogive having the second power-series exponent 132 (FIG. 1).

Referring generally to FIG. 1 and particularly to FIGS. 6-15, the aerodynamic body 100 includes a leading edge 134. In one or more examples, the leading edge 134 of the aerodynamic body 100 is formed by the waverider-leading edge 174 of the waverider shape 110 (FIG. 5). The upper surface 104 and the lower surface 108 emanate from the leading edge 134. The upper surface 104 and the lower surface 108 extend in an aft direction along a longitudinal axis 118 of the aerodynamic body 100.

In one or more examples, the aerodynamic body 100 includes a tip 136. The tip 136 is located on the leading edge 134. The leading edge 134 emanates from the tip 136. The leading edge 134 extends in the aft direction along the longitudinal axis 118 of the aerodynamic body 100.

Figure 8:
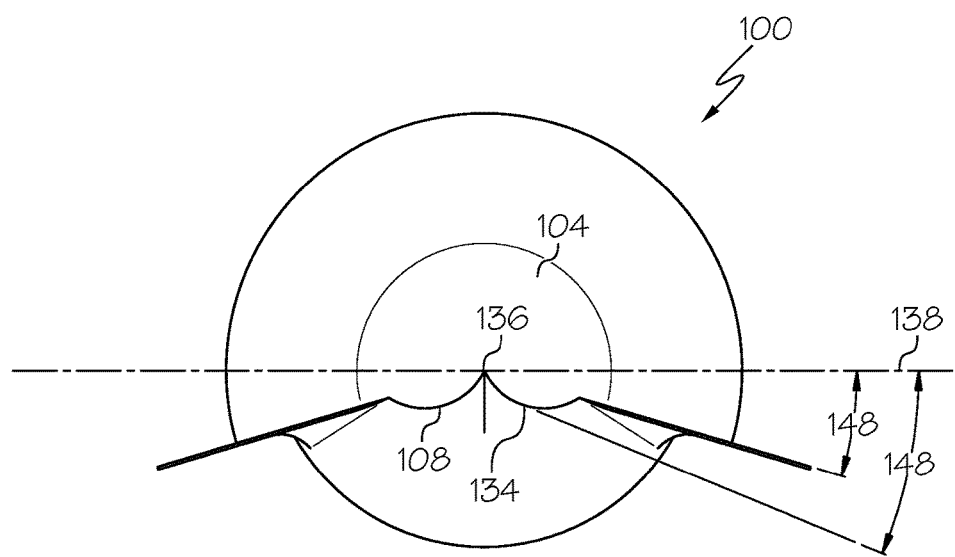
FIG. 8 is a schematic, end view of the aerodynamic body of FIG. 6.
Figure 9:
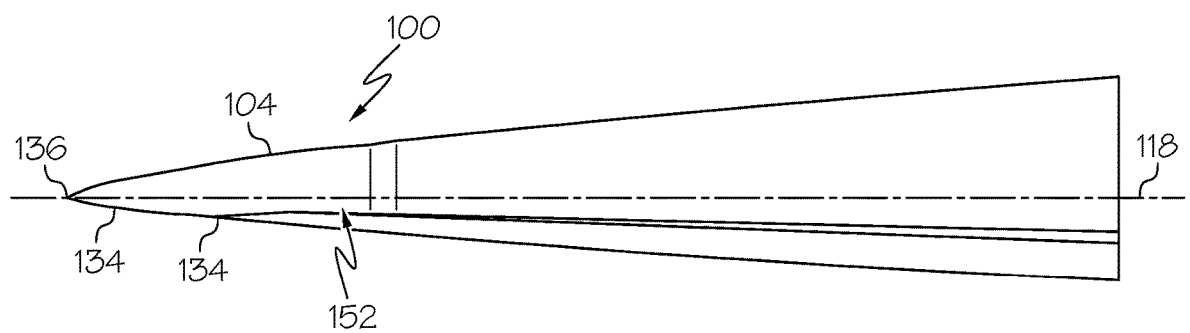
FIG. 9 is a schematic, side elevation view of the aerodynamic body of FIG. 6.
Figure 10:
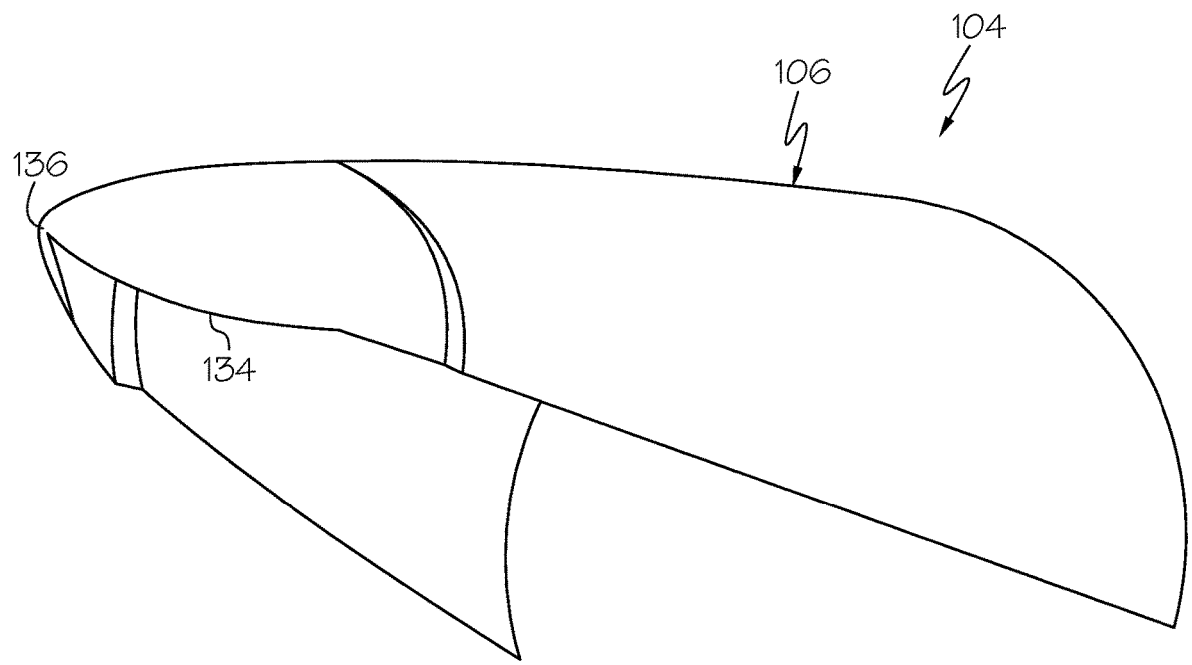
FIG. 10 is a schematic, perspective view of an example of an upper surface of the aerodynamic body of FIG. 6.
Figure 11:
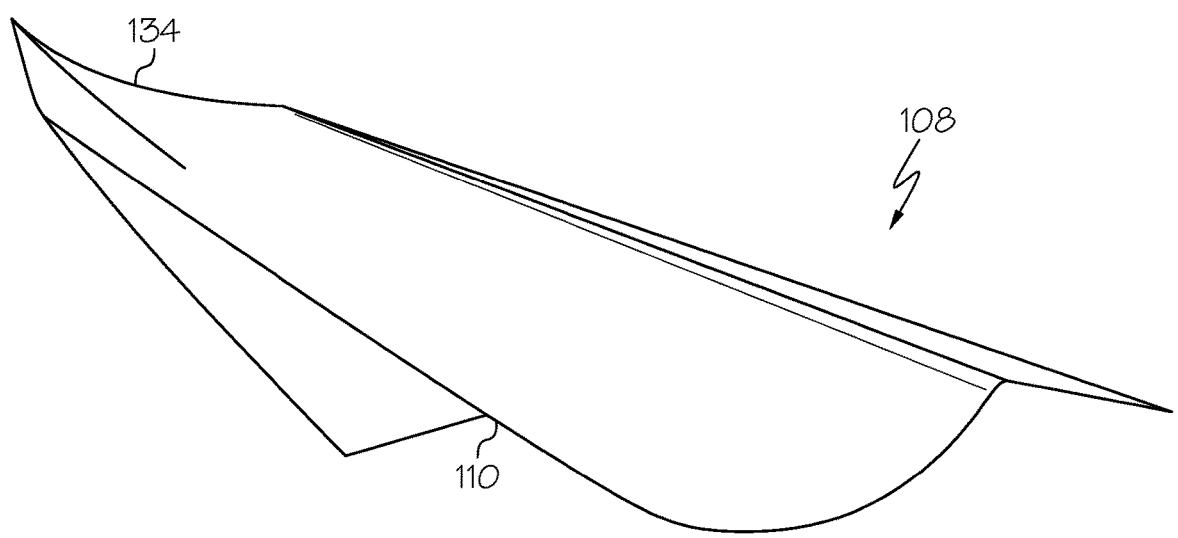
FIG. 11 is a schematic, perspective view of an example of a lower surface of the aerodynamic body of FIG. 6.
Figure 12:
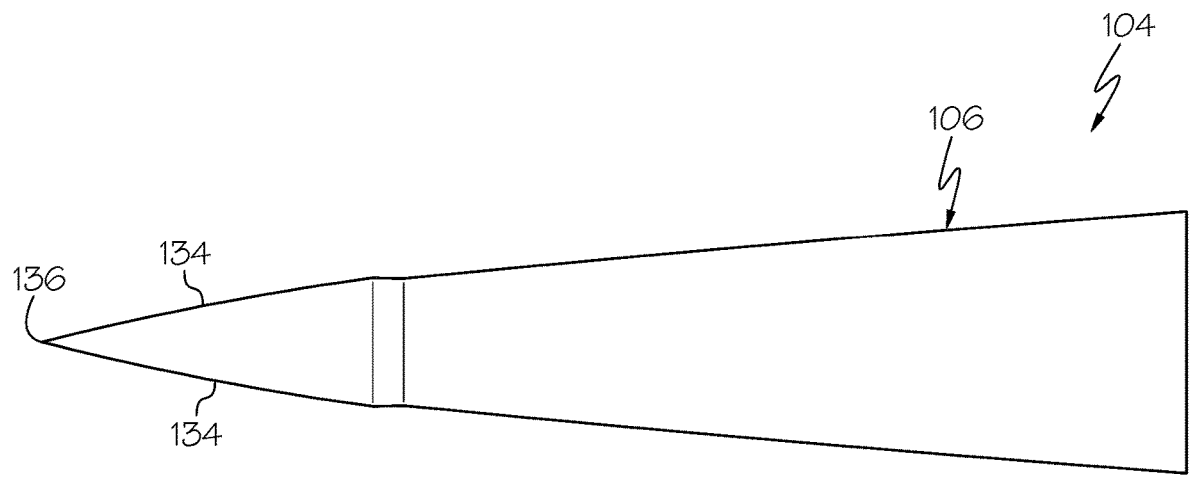
FIG. 12 is a schematic, top plan view of the upper surface of the aerodynamic body of FIG. 6.
Figure 13:
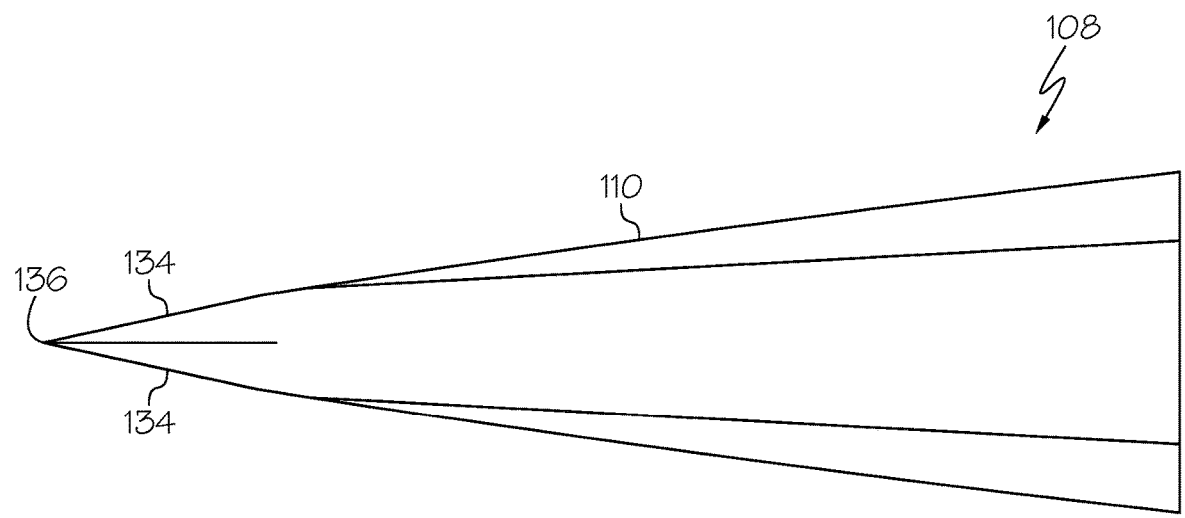
FIG. 13 is a schematic, bottom plan view of the lower surface of the aerodynamic body of FIG. 6.

Referring to FIG. 8, in one or more examples, the leading edge 134 is oriented at an angle 148 relative to a transaxial plane 138 of the aerodynamic body 100 that contains the tip 136. In one or more examples, the angle 148 is a non-zero angle. In other words, the leading edge 134 may be oriented at an angle that is greater than zero-degrees and less than approximately ninety-degrees relative to the transaxial plane 138. In one or more examples, the angle 148 is a zero angle. In other words, the leading edge 134 may be oriented at approximately zero-degrees relative to the transaxial plane 138 (e.g., approximately parallel to the transaxial plane 138).

Generally, the leading edge 134 includes two portions. A first portion of the leading edge 134 is formed by a first portion of the waverider-leading edge 174 (e.g., as illustrated in FIG. 5) and extends outwardly from the tip 136 in a leftward (e.g., port) direction. A second portion of the leading edge 134 is formed by a second portion of the waverider-leading edge 174 and extends outwardly from the tip 136 in a rightward (e.g., starboard) direction.

The transaxial plane 138 is a virtual plane that includes the longitudinal axis 118 of the aerodynamic body 100, which extends through the tip 136, and a transverse axis of the aerodynamic body 100 that is perpendicular to the longitudinal axis 118.

In one or more examples, the angle 148 is constant along the leading edge 134. In other words, the angular orientation of the leading edge 134 relative to the transaxial plane 138 of the aerodynamic body 100 is constant along the length of the leading edge 134.

In one or more examples, the angle 148 varies along the leading edge 134. In other words, the angular orientation of the leading edge 134 relative to the transaxial plane 138 of the aerodynamic body 100 varies along the length of the leading edge 134.

In one or more examples, as illustrated in FIG. 8, the angle 148 varies along one portion the leading edge 134 and is constant along another portion of the leading edge 134. In other words, the angular orientation of the leading edge 134 relative to the transaxial plane 138 of the aerodynamic body 100 varies along a first portion of the length of the leading edge 134 and is constant along a second portion of the length of the leading edge 134.

The angle 148 may describe the angular orientation of a line that is coincident with the leading edge 134 or tangent to any point along the leading edge 134. In one or more examples, the angular orientation of the leading edge 134 (e.g., the angle 148) at any point along the length of the leading edge 134 may be a parameter used in the optimization operation. For example, the selected value of the angle 148 may be determined by the constraints applied to the optimization operation.

In one or more examples, the geometry of the leading edge 134 and/or the angular orientation of the leading edge 134 (e.g., the angle 148) at any point along the length of the leading edge 134 may depend upon the leading-edge curve placed on the shockwave 180 during derivation of the waverider shape 110. For example, the leading edge 134 includes, or is formed by, a third parametric shape 140 (FIG. 1) that lies on a three-dimensional shockwave 180 generated by the second axisymmetric body 112.

Figure 6:
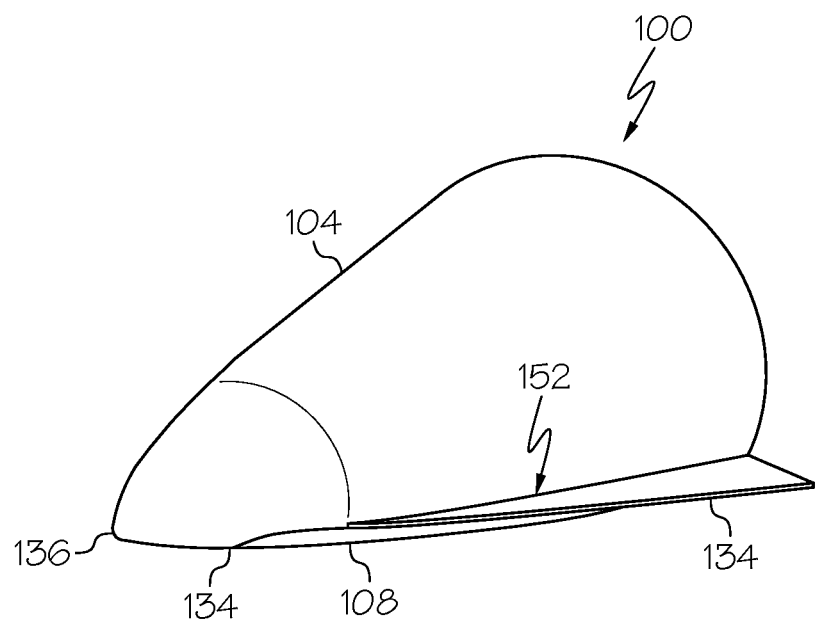
FIG. 6 is a schematic, left perspective view of an example of the aerodynamic body.
Figure 7:
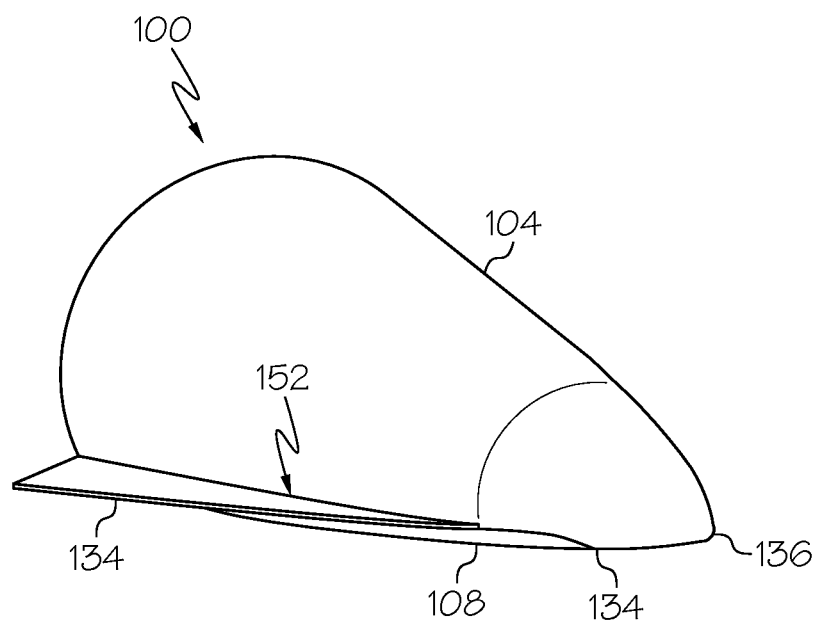
FIG. 7 is a schematic, right perspective view of the aerodynamic body of FIG. 6.

The upper surface 104 and the lower surface 108 are mated, or coupled, together along an interface 152. In one or more examples, such as illustrated in FIGS. 6 and 7, the interface between the upper surface 104 and the lower surface 108 may be inboard of the leading edge 134 of the aerodynamic body 100. In such examples, the aerodynamic body 100 may include one or more closeout structures that extend from the upper surface 104 to the leading edge 134.

Accordingly, as illustrated in FIGS. 6-15, in one example implementation, the aerodynamic body 100 includes a hybrid shape that includes a first portion (e.g., the upper surface 104) formed by a first power-series ogive (e.g., the first axisymmetric body 106) and a second portion (e.g., the lower surface 108) formed by a waverider (e.g., the waverider shape 110) generated from the shockwave 180 generated by a second power-series ogive (e.g., the second axisymmetric body 112). In various examples, the power-series exponent (e.g., the second power-series exponent 132) of the second power-series ogive may be equal to, less than, or greater than the power-series exponent (e.g., the first power-series exponent 130) of the first power-series ogive.

In one or more examples of the aerodynamic body 100, use of the ogive, such as the power-series ogive, as the first axisymmetric body 106 and the second axisymmetric body 112 may provide optimization benefits to both aerodynamic efficiency and volumetric efficiency. Use of the ogive produces the aerodynamic body 100 that has a relatively small radius and, thus, a relatively small surface area toward the front of aerodynamic body 100 where drag is higher and an a relatively large radius and, thus, a relatively large surface area toward the rear of the aerodynamic body 100 where drag is lower. Further, use of the power-series ogive enables the bluntness of tip 136 of the aerodynamic body 100 to be tailored, which enables an increase in forward volume and moves the center of gravity of the aerodynamic body 100 forward.

Accordingly, optimization of the parameters defining the power-series ogive of the first axisymmetric body 106 that forms the upper surface 104, the power-series ogive of the second axisymmetric body 112 used to generate the shockwave 180 from which the waverider shape 110 is derived that forms the lower surface 108, and the parameters defining leading edge 134 combine to maximize the lift-to-drag ratio for a body that also has high volumetric efficiency. Therefore, integration of the two different shapes increase lift provided by the lower surface 108 and reduces drag provided by the upper surface 104 and the lower surface. Implementation of the aerodynamic body 100 as the aerospace vehicle 102 may also optimize the maximum lift-to-drag ratio for the entire aerospace vehicle 102 that has a high volumetric efficiency. In one or more examples, the benefit of the design of the aerodynamic body 100 over existing aerodynamic bodies is a greater than twenty-nine percent (29%) improvement in aerodynamic efficiency.

Figure 18:
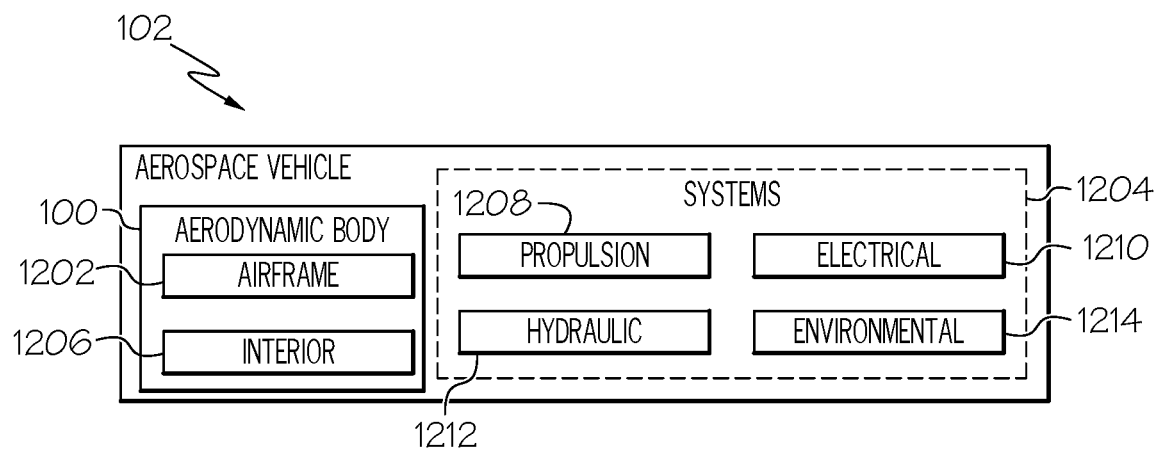
FIG. 18 is a schematic block diagram of an example of an aerospace vehicle.

Referring to FIGS. 1 and 18, in one or more examples, the aerospace vehicle 102 includes, or is formed by, the aerodynamic body 100. In an example implementation, the aerospace vehicle 102 is, or takes the form of, a flying wing.

The aerospace vehicle 102 includes the upper surface 104 and the lower surface 108. The upper surface 104 includes, or is formed by, the first axisymmetric body 106, such as a portion of the first axisymmetric body 106. The lower surface 108 is mated with the upper surface 104. The lower surface 108 includes, or is formed by, the waverider shape 110. The waverider shape 110 is derived from the shockwave 180 generated by the second axisymmetric body 112. Generally, the waverider shape 110 of the lower surface 108 forms the lifting surface of the aerospace vehicle 102.

In one or more examples of the aerospace vehicle 102, the first axisymmetric body 106 and the second axisymmetric body 112 are selected to concurrently optimize the lift-to-drag ratio of the aerospace vehicle 102, for example, at greater than supersonic speed, and optimize the overall volume of the aerospace vehicle 102. For example, the first axisymmetric body 106 is selected to maximize a first portion of the volume of the aerodynamic body 100 formed by the upper surface 104 and to minimize drag induced by the upper surface 104. The second axisymmetric body 112 is selected to maximize a second portion of the volume of the aerodynamic body 100 formed by the lower surface 108, to maximize lift generated by the lower surface 108, and to minimize drag induced by the lower surface 108.

Figure 15:
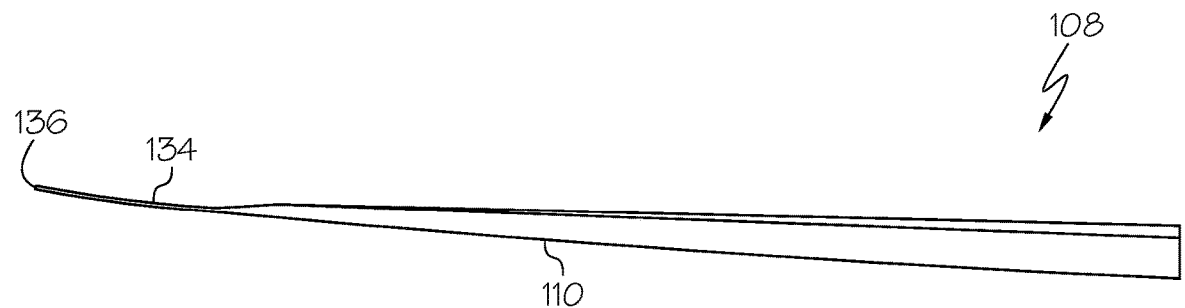
FIG. 15 is a schematic, side elevation view of the lower surface of the aerodynamic body of FIG. 6.

Referring to FIG. 15, by way of examples, the present disclosure is further directed to a method 1000 of making the aerodynamic body 100 (FIGS. 1 and 3-12) that increases the aerodynamic efficiency (e.g., the maximum lift-to-drag ratio), for example, at greater than supersonic speed, and that increases the volumetric efficiency of the aerodynamic body 100. In one or more example implementations of the disclosed method 1000, the method 1000 is directed to making the aerospace vehicle 102 (FIGS. 1 and 18) that increases the maximum lift-to-drag ratio of the aerospace vehicle 102, such as at greater than supersonic speed, and that increases the volumetric efficiency of the aerospace vehicle 102. In such examples, the aerospace vehicle 102 includes, or is at least partially formed from, the aerodynamic body 100.

In one or more examples, the method 1000 includes a step of (block 1006) forming the upper surface 104 of the aerodynamic body 100. The upper surface 104 includes, or is formed by, the first axisymmetric body 106.

In one or more examples, the method 1000 includes a step of (block 1008) forming the lower surface 108 of the aerodynamic body 100. The lower surface 108 includes, or is formed by, the waverider shape 110. The waverider shape 110 is derived from the shockwave 180 generated by the second axisymmetric body 112.

In one or more examples, the method 1000 includes a step of (block 1010) mating the upper surface 104 and the lower surface 108 together. In one or more examples, the upper surface 104 and the lower surface 108 are mated together along the interface 152. In one or more example, the leading edge 134 is located outboard of the interface 152. In one or more example, the leading edge 134 is located along the interface 152.

In one or more examples, the method 1000 includes a step of (block 1002) selecting the first axisymmetric body 106 and a step of (block 1004) selecting the second axisymmetric body 112. The first axisymmetric body 106 and the second axisymmetric body 112 are selected to optimize the lift-to-drag ratio of the aerodynamic body 100 and to optimize the volumetric efficiency of the aerodynamic body 100.

In one or more examples, the step of (block 1002) selecting the first axisymmetric body 106 includes a step of selecting the first axisymmetric body 106 to maximize the first portion of the overall volume of the aerodynamic body 100 formed by the upper surface 104 and to minimize drag induced by the upper surface 104. In one or more examples, the step of (block 1004) selecting the second axisymmetric body 112 includes a step of selecting the second axisymmetric body 112 to maximize the second portion of the overall volume of aerodynamic body 100 formed by the lower surface 108, to maximize lift generated by the lower surface 108, and to minimize drag induced by the lower surface 108. The step of (block 1002) selecting the first axisymmetric body 106 and the step of (block 1004) selecting the second axisymmetric body 112 may be performed concurrently as part of the (e.g., computer implemented) optimization operation based on a variety of parameters and constraints.

In one or more examples, the step of (block 1002) selecting the first axisymmetric body 106 and the step of (block 1004) selecting the second axisymmetric body 112 includes a step of selecting the first axisymmetric body 106 and the second axisymmetric body 112 to be the same. In one or more examples, the step of (block 1002) selecting the first axisymmetric body 106 and the step of (block 1004) selecting the second axisymmetric body 112 includes a step of selecting the first axisymmetric body 106 and the second axisymmetric body 112 to be different.

In one or more examples, the step of (block 1002) selecting the first axisymmetric body 106 and the step of (block 1004) selecting the second axisymmetric body 112 includes a step of selecting each one of the first axisymmetric body 106 and the second axisymmetric body 112 to be the ogive 126.

In one or more examples, the step of (block 1002) selecting the first axisymmetric body 106 and the step of (block 1004) selecting the second axisymmetric body 112 includes a step of selecting each one of the first axisymmetric body 106 and the second axisymmetric body 112 to be the power series shape 128.

In one or more examples, the step of selecting each one of the first axisymmetric body 106 and the second axisymmetric body 112 to be the power series shape 128 includes a step of selecting the second power-series exponent 132 of the second axisymmetric body 112 to be greater than the first power-series exponent 130 of the first axisymmetric body 106. In one or more examples, the step of selecting each one of the first axisymmetric body 106 and the second axisymmetric body 112 to be the power series shape 128 includes a step of selecting the second power-series exponent 132 of the second axisymmetric body 112 to be less than the first power-series exponent 130 of the first axisymmetric body 106. In one or more examples, the step of selecting each one of the first axisymmetric body 106 and the second axisymmetric body 112 to be the power series shape 128 includes a step of selecting the second power-series exponent 132 of the second axisymmetric body 112 to be equal to the first power-series exponent 130 of the first axisymmetric body 106.

In one or more examples, the step of selecting each one of the first axisymmetric body 106 and the second axisymmetric body 112 to be the power series shape 128 includes a step of selecting the second power-series exponent 132 to be at least twenty-five percent (25%) greater than the first power-series exponent 130. In one or more examples, the step of selecting each one of the first axisymmetric body 106 and the second axisymmetric body 112 to be the power series shape 128 includes a step of selecting the second power-series exponent 132 to be at least fifty percent (50%) greater than the first power-series exponent 130. In one or more examples, the step of selecting each one of the first axisymmetric body 106 and the second axisymmetric body 112 to be the power series shape 128 includes a step of selecting the first power-series exponent 130 to be between approximately 0.3 and 0.4 and selecting the second power-series exponent 132 to be approximately 0.8.

In one or more examples, the method 1000 includes a step of (block 1012) forming the leading edge 134 of the aerodynamic body 100. The leading edge 134 is formed by the waverider-leading edge 174 of the waverider shape 110. The upper surface 104 and the lower surface 108 extend from the leading edge 134 and extend in the aft direction along the longitudinal axis 118 of the aerodynamic body 100.

In one or more examples, the step of (block 1012) forming the leading edge 134 of the aerodynamic body 100 includes a step of selecting the leading edge 134 that includes, or is formed by, the third parametric shape 140 that lies on the three-dimensional shape of the shockwave 180 generated by the second axisymmetric body 112. The third parametric shape 140 that lies on the three-dimensional shape of the shockwave 180 generated by the second axisymmetric body 112 is the leading-edge curve drawn on the shockwave 180 that forms the waverider-leading edge 174.

Figure 17:
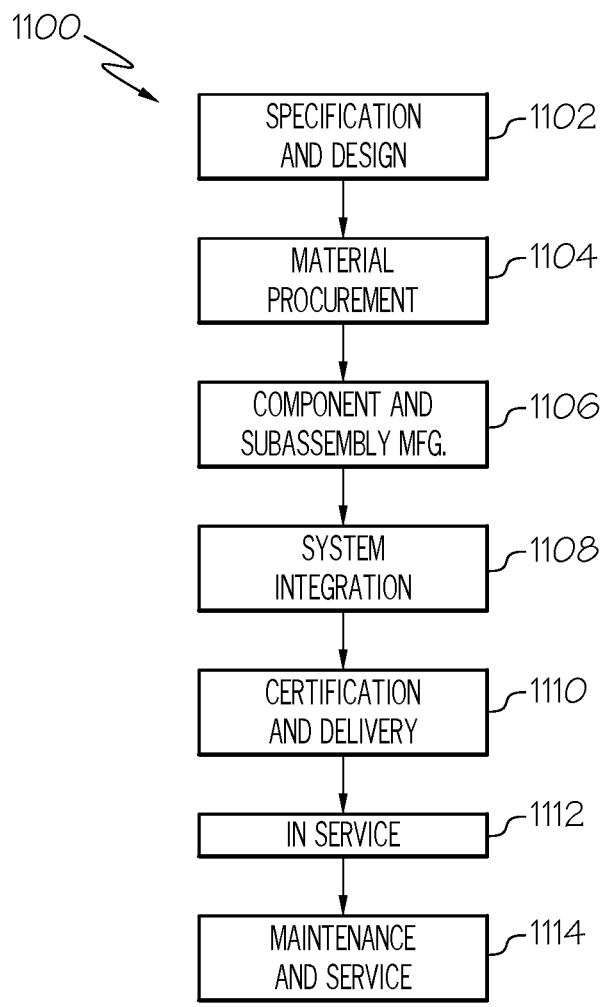
FIG. 17 is a flow diagram of a manufacturing and service methodology.

Referring now to FIGS. 17 and 18, examples of the aerodynamic body 100 and the method 1000 may be used in the context of an aerospace vehicle manufacturing and service method 1100, as shown in the flow diagram of FIG. 17 and the aerospace vehicle 102, as schematically illustrated in FIG. 18.

Referring to FIG. 18, in one or more examples, the aerospace vehicle 102 includes an airframe 1202, having an interior 1206, and a plurality of high-level systems 1204. Examples of the high-level systems 1204 include one or more of a propulsion system 1208, an electrical system 1210, a hydraulic system 1212, and an environmental system 1214. In other examples, the aerospace vehicle 102 may include any number of other types of systems, such as a communications system, a guidance system, and the like. The aerodynamic body 100 designed and made in accordance with the method 1000 may be any one of a structure, an assembly, a sub-assembly, a component, a part, or any other portion of the aerospace vehicle 102, such as a portion of the airframe 1202, such as a portion of the fuselage or nose cone.

Figure 16:
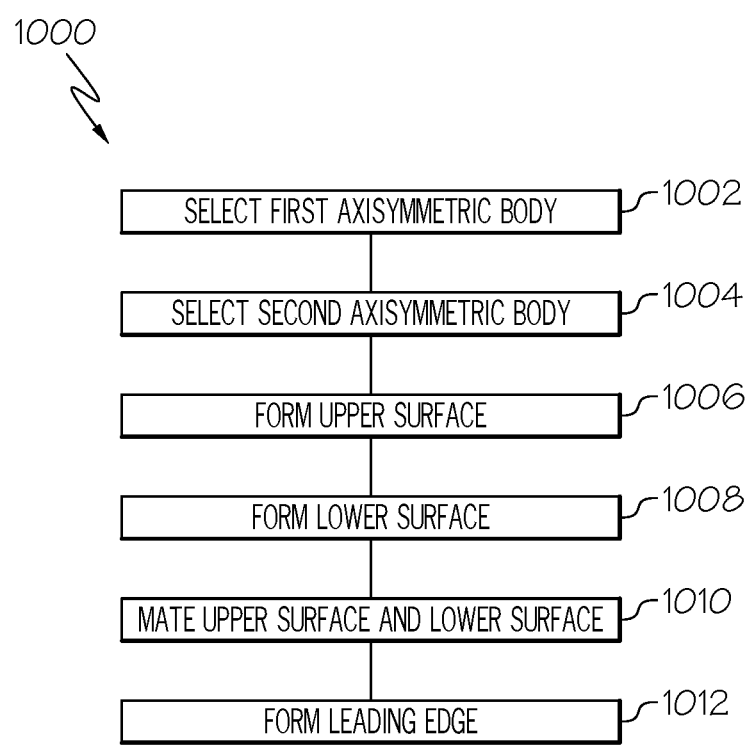
FIG. 16 is a flow diagram of an example of a method of making an aerodynamic body.

Referring to FIG. 16, during pre-production, the method 1100 includes specification and design of the aerospace vehicle 102 (block 1102) and material procurement (block 1104). During production of the aerospace vehicle 102, component and subassembly manufacturing (block 1106) and system integration (block 1108) of the aerospace vehicle 102 take place. Thereafter, the aerospace vehicle 102 goes through certification and delivery (block 1110) to be placed in service (block 1112). Routine maintenance and service (block 1114) includes modification, reconfiguration, refurbishment, etc. of one or more systems of the aerospace vehicle 102.

Each of the processes of the method 1100 illustrated in FIG. 16 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the aerodynamic body 100 and the method 1000 shown and described herein may be employed during any one or more of the stages of the manufacturing and service method 1100 shown in the flow diagram illustrated by FIG. 16. In an example, implementation of the disclosed aerodynamic body 100 and the method 1000 may form a portion of component and subassembly manufacturing (block 1106) and/or system integration (block 1108). For example, assembly of the aerospace vehicle 102 and/or components thereof using implementations of the disclosed aerodynamic body 100 and the method 1000 may correspond to component and subassembly manufacturing (block 1106) and may be prepared in a manner similar to components or subassemblies prepared while the aerospace vehicle 102 is in service (block 1112). Also, implementations of the disclosed aerodynamic body 100 and the method 1000 may be utilized during system integration (block 1108) and certification and delivery (block 1110). Similarly, implementations of the disclosed aerodynamic body 100 and the method 1000 may be utilized, for example and without limitation, while the aerospace vehicle 102 is in service (block 1112) and during maintenance and service (block 1114).

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the terms "about" and "approximately" refer to or represent a condition that is close to, but not exactly, the stated condition that still performs the desired function or achieves the desired result. As an example, the terms "about" and "approximately" refer to a condition that is within an acceptable predetermined tolerance or accuracy. For example, the terms "about" and "approximately" refer to a condition that is within 10% of the stated condition. However, the terms "about" and "approximately" do not exclude a condition that is exactly the stated condition.

Figure 14:
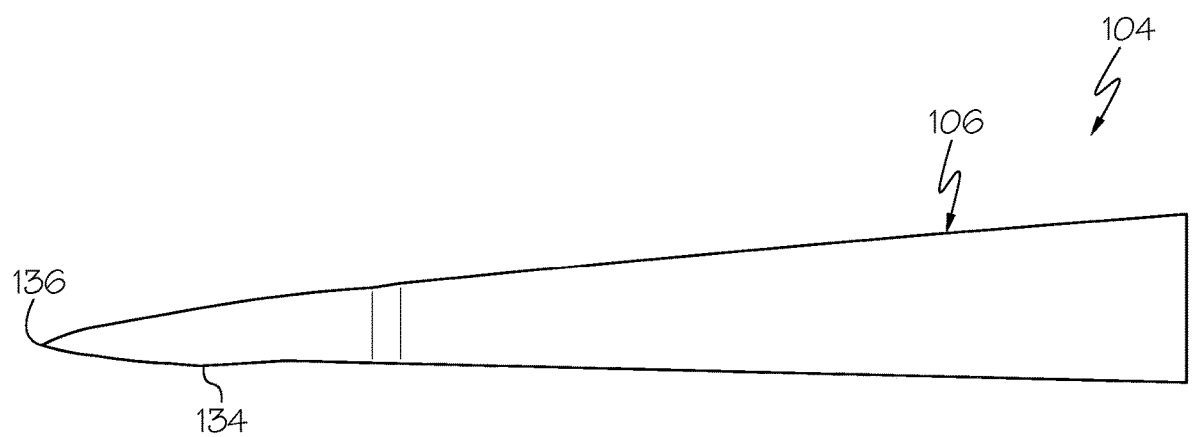
FIG. 14 is a schematic, side elevation view of the upper surface of the aerodynamic body of FIG. 6.

In FIGS. 1 and 14, referred to above, the blocks may represent functional elements, features, or components thereof and lines connecting the various blocks do not necessarily imply any particular structure. Accordingly, modifications, additions and/or omissions may be made to the illustrated structure. Additionally, those skilled in the art will appreciate that not all elements described and illustrated in FIGS. 1-15 and 18, referred to above, need be included in every example and not all elements described herein are necessarily depicted in each illustrative example. Unless otherwise explicitly stated, the schematic illustrations of the examples depicted in FIGS. 1-15 and 18, referred to above, are not meant to imply structural limitations with respect to the illustrative example. Rather, although one illustrative structure is indicated, it is to be understood that the structure may be modified when appropriate.

In FIGS. 16 and 17, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 16 and 17 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the aerodynamic body 100 and the method 1000 have been shown and described, modifications may occur to those skilled in the art upon reading the specification. The present application includes such modifications and is limited only by the scope of the claims.

What is claimed is:

1. An aerodynamic body comprising:
an upper surface comprising a first shape; and
a lower surface mated with the upper surface and comprising a waverider shape,
wherein:
the first shape is derived from a portion of a first axisymmetric body;
the waverider shape is derived from a shockwave generated by a second axisymmetric body;
the first axisymmetric body comprises a first power series shape having a first power-series exponent;
the second axisymmetric body comprises a second power series shape having a second power-series exponent; and
the second power-series exponent is greater than the first power-series exponent.

2. The aerodynamic body of claim 1, wherein the first axisymmetric body and the second axisymmetric body are concurrently selected to optimize a lift-to-drag ratio of the aerodynamic body at greater than supersonic speed and to optimize a volumetric efficiency of the aerodynamic body.

3. The aerodynamic body of claim 1, wherein at least one of the first axisymmetric body and the second axisymmetric body is an ogive.

4. The aerodynamic body of claim 1, further comprising a leading edge, wherein:
the upper surface and the lower surface emanate from the leading edge and extend in an aft direction along a longitudinal axis of the aerodynamic body; and
the leading edge is formed by a waverider-leading edge of the waverider shape.

5. An aerospace vehicle comprising:
an upper surface comprising a first shape; and
a lower surface mated with the upper surface and comprising a waverider shape,
wherein:
the first shape is derived from a portion of a first axisymmetric body;
the waverider shape is derived from a shockwave generated by a second axisymmetric body;
the first axisymmetric body comprises a first power series shape having a first power-series exponent;
the second axisymmetric body comprises a second power series shape having a second power-series exponent; and
the second power-series exponent is greater than the first power-series exponent.

6. The aerospace vehicle of claim 5, wherein the first axisymmetric body and the second axisymmetric body are concurrently selected to optimize a lift-to-drag ratio of the aerospace vehicle at greater than supersonic speed and to optimize a volumetric efficiency of the aerospace vehicle.

7. The aerospace vehicle of claim 5, wherein at least one of the first axisymmetric body and the second axisymmetric body is an ogive.

8. A method of making an aerodynamic body, the method comprising:
forming an upper surface of the aerodynamic body, the upper surface comprising a first shape;
forming a lower surface of the aerodynamic body, the lower surface comprising a waverider shape; and
mating the upper surface and the lower surface,
wherein:
the first shape is derived from a portion of a first axisymmetric body;
the waverider shape is derived from a shockwave generated by a second axisymmetric body;
the first axisymmetric body comprises a first power series shape having a first power-series exponent;
the second axisymmetric body comprises a second power series shape having a second power-series exponent; and
the second power-series exponent is greater than the first power-series exponent.

9. The method of claim 8, further comprising:
selecting the first axisymmetric body and the second axisymmetric body to optimize a lift-to-drag ratio of the aerodynamic body and to optimize a volumetric efficiency of the aerodynamic body.

10. The method of claim 8, further comprising selecting at least one of the first axisymmetric body and the second axisymmetric body to be an ogive.

11. The aerodynamic body of claim 1, wherein the first axisymmetric body if formed by a first parametric shape rotated about a first symmetry axis.

12. The aerodynamic body of claim 11, wherein at least a portion of the first parametric shape is convex.

13. The aerodynamic body of claim 11, wherein at least a portion of the first parametric shape is concave.

14. The aerodynamic body of claim 11, wherein at least a portion of the first parametric shape is straight.

15. The aerodynamic body of claim 1, wherein the second axisymmetric body if formed by a second parametric shape rotated about a second symmetry axis.

16. The aerodynamic body of claim 15, wherein at least a portion of the second parametric shape is convex.

17. The aerodynamic body of claim 15, wherein at least a portion of the second parametric shape is concave.

18. The aerodynamic body of claim 15, wherein at least a portion of the second parametric shape is straight.

19. The aerodynamic body of claim 4, wherein the leading edge is oriented at an angle that is constant along a portion of a length of the leading edge relative to a transaxial plane of the aerodynamic body and that varies along another portion of the length of the leading edge relative to the transaxial plane of the aerodynamic body.

20. The aerospace vehicle of claim 5, further comprising a leading edge,
wherein:
the upper surface and the lower surface emanate from the leading edge and extend in an aft direction along a longitudinal axis of the aerospace vehicle;
the leading edge is formed by a waverider-leading edge of the waverider shape; and
the leading edge is oriented at an angle that is constant along a portion of a length of the leading edge relative to a transaxial plane of the aerodynamic body and that varies along another portion of the length of the leading edge relative to the transaxial plane of the aerodynamic body.

* * * * *